Nov. 8, 1960 H. G. KEPNER 2,959,188
CHECK VALVE
Filed Feb. 11, 1955 2 Sheets-Sheet 1
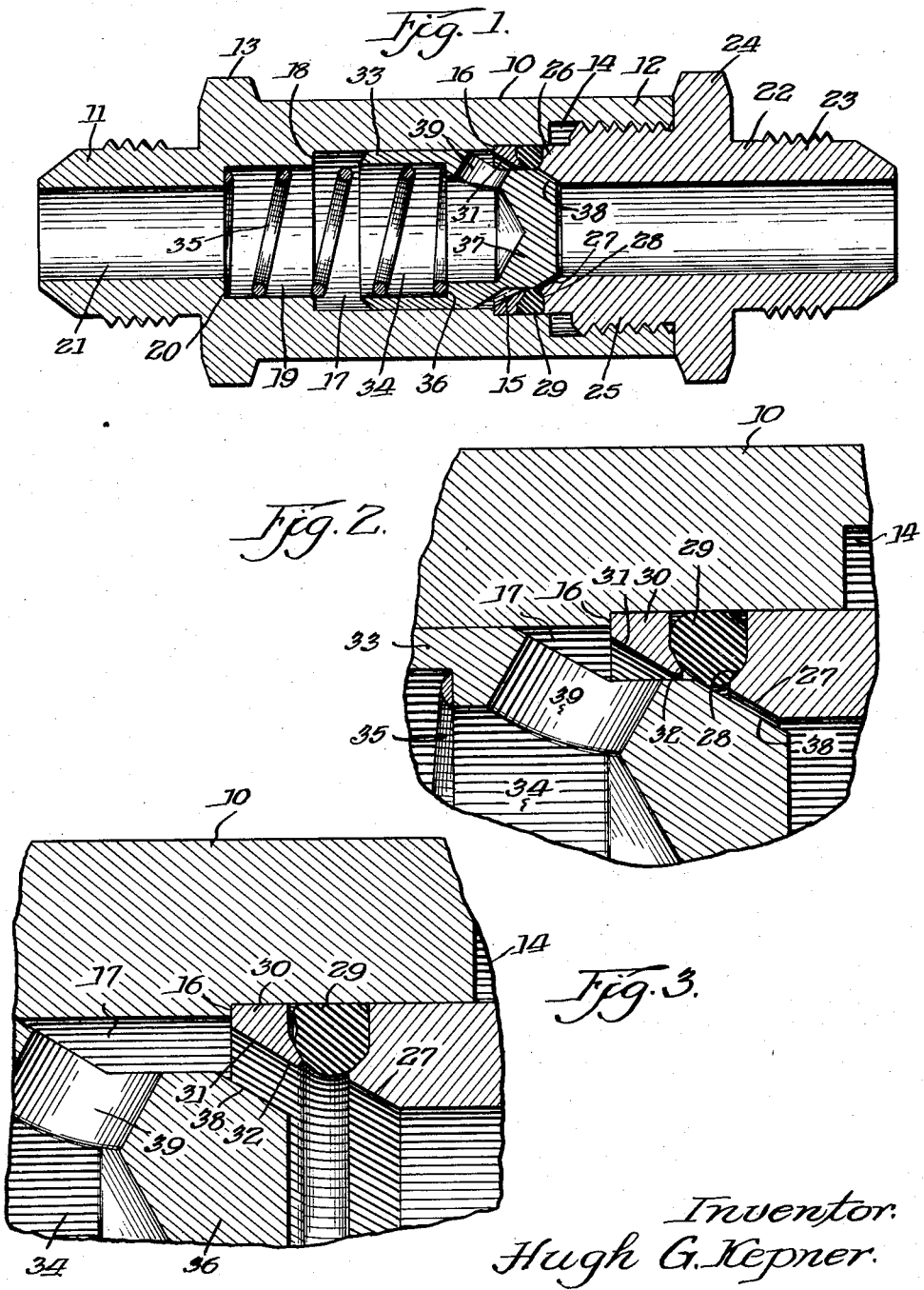
Inventor:
Hugh G. Kepner.

Nov. 8, 1960  H. G. KEPNER  2,959,188
CHECK VALVE
Filed Feb. 11, 1955  2 Sheets-Sheet 2

Inventor.
Hugh G. Kepner.
By Wilkinson, Huxley, Byron & Hume
Attys.

United States Patent Office 2,959,188
Patented Nov. 8, 1960

2,959,188

CHECK VALVE

Hugh G. Kepner, 7321 W. 59th St., Summit, Ill.

Filed Feb. 11, 1955, Ser. No. 487,598

4 Claims. (Cl. 137—540)

My invention relates to check valves and has particular reference to a poppet type valve such as is used for check valves, shuttle valves, pressure relief valves and selector valves and has for its primary purpose the provision of a valve for the control of very high pressures, particularly in hydraulic operations.

Another object of my invention is the provision of a valve for use with extremely high pressures and has particular reference to a seat construction through which very little, if any, leakage is apt to occur, and which provides a secondary seal for such leakage if it occurs and also seals the valve casing against back pressure leakage around the valve proper and through the joints of the valve casing in both open and closed positions of the check valve.

Another and further object of my invention is the provision of a valve in which a flexible sealing member is used which provides a leak-tight seal despite the presence of foreign particles, dirt, and the like at the sealing joint which would normally be carried to such point by the fluid passing through the system.

Another and further object of my invention is the provision of a valve providing an end cap and body joint in which one sealing member provides a seal against leakage through the valve and also seals against external leakage around the end of the cap and prevents any such leakage from flowing out between the juncture of the valve casing and the end cap in either open or closed position of the valve.

Another and further object of my invention is the provision of a check valve having a flexible seal therein mounted in a seal seat in such manner that it cannot be displaced by operation of the valve, nor can it be displaced by differential pressure existing in the valve casing or because of either flow pressure or the pressure of the fluid being transmitted because the pressures to which it may be subjected causes it to seat more closely, thus effectively sealing the areas through which fluid may escape in either open or closed position of the valve.

Another and further object of my invention is the provision of a check valve which can be easily and cheaply manufactured without the necessity of close machining of the interfitting parts to provide close fittings to effectively seal fluids under extremely high pressures now used as the operating parts of machinery, equipment, airplanes, and the like without the danger of leakage, and is also light in weight.

Another and further object of my invention is the provision of a check valve formed of a body member and a cap therefor and in which the valve seat is formed on the end of the cap which is external to the main body of the cap and thereby easily formed by proper tooling or the like, as distinguished from seats formed at the bottom of a recess or within some internal bore where access to the seat is difficult to obtain and in which a maximum bore is provided for the passage of fluids therethrough with a comparatively light and small casing.

Another and further object of my invention is the provision of a valve having a flexible sealing member mounted adjacent the valve seat rather than in the valve member itself, which permits the use of a wide variety of valve poppet designs as well as other valve designs such as a ball, and the like, and which provides a thorough and accurate seal both for the valve and for the valve casing.

Another and further object of my invention is the provision of a valve mechanism in the open end of the body member which permits the use of a relatively large valve seat bore at the point of seal without sacrificing wall strength in the body, which permits a fluid to flow freely through the passage around the valve so that this area is not confined, thereby producing a backup pressure of fluid passing through the check valve.

Another and further object of my invention is the provision of a check valve having a sealing means therefor which effectually seals the mechanism against leakage should the cooperating surfaces of the valve and the valve seat be scratched, channeled, or deformed in some particular manner in order that a very small leakage would be permitted between the valve and its seat and in which such leakage would be sealed off at the valve seat as well as being sealed off externally around the flexible sealing member adjacent the valve seat.

Another and further object of my invention is the provision of a check valve in which the valve member is slightly larger in diameter than is the seat on the discharge side thereof, so that as the valve member is forced towards the seat, the flexible ring seal seated adjacent the valve seat is slightly compressed and brought into close contact with a portion of the valve seat and the outer periphery of the valve adjacent the rear portion of the seat, and the back flow of the fluid under pressure which has passed the valve exerts its pressure on the sealing ring, thereby bringing the sealing ring into close engagement with the inner surface of the wall of the valve casing and the end of the cap, thereby effectively sealing any back flow or any fluid which may leak through the valve.

These and other objects of my invention will be more fully and better understood by reference to the accompanying drawings and in which—

Fig. 1 is a longitudinal sectional view through one of my improved valves.

Fig. 2 is a detailed sectional view showing the valve just short of its closed position and a slight deformation of the sealing ring caused by the valve surface with no fluid pressure.

Fig. 3 is a view similar to Fig. 2 with the valve in full and open position with full internal fluid pressure on the sealing ring.

Figure 4:
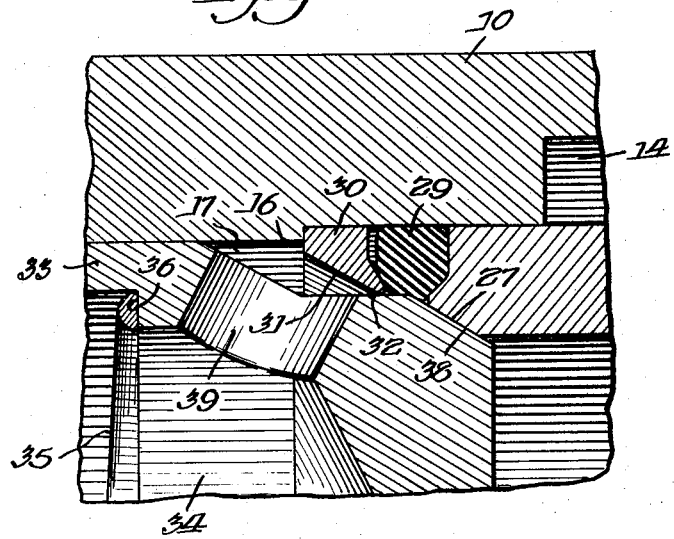
Fig. 4 is a view of the parts shown in Figs. 2 and 3 but with the valve in fully closed position while checking reverse flow at full fluid pressure.

Referring now specifically to the drawings and in which like reference characters refer to like parts throughout, a check valve is shown comprising a body 10 having an externally threaded trunnion 11 at one end and having an internally threaded portion 12 at its opposite end, with a wrench portion 13 extending therearound which is adapted to be engaged by a wrench for holding or turning the body member, as might be desired, for inserting the valve in a line or in assembling operations connected with the valve itself. The body member 10 has a bore extending longitudinally thereof of varying diameters, as hereinafter described, with a chamber 14 being formed at one end which communicates with a second chamber 15 that extends from the end of the chamber 14 to an annular shoulder 16 extending circumferentially of the body member 10, with a third chamber 17 being formed which extends between the annular shoulder 16 and a shoulder 18 also extending circumferentially of the body member 10, with another chamber 19 being provided between an annular shoulder 20 internally of the bore and the shoulder 18, all of these chambers being in communication with each other before the working parts of the check valve are assembled, with a bore 21 extending through the portion 11 being in communication with the chamber 19, so that provision is made for the housing of the operating parts in the body member 10 hereinafter described and for the passage of fluid through the valve.

A cap 22 is provided having an externally threaded end portion 23 for engagement with a pipe union, or the like, and an annular wrench portion 24 thereon for gripping purposes for a wrench and as a stop for one end of the body 10, with an externally threaded portion 25 being provided which is interfitted into the internally threaded end 12 of the body member 10 and serves to secure the cap 22 and the body member 10 together. The externally threaded end portion 25 terminates in an end portion 26 which extends into the chamber 14 in the body member 10 and has an annular angularly extending valve seat 27 formed thereon, the end portion 26 having a wide-angled seal wall 28 which merges into the valve seat 27 and forms an abutting and partially encompassing wall for the chamber 15 within which an elastic sealing ring 29 is mounted, preferably in the form of an O ring, or the like, and which acts as an auxiliary sealing member for the valve and against pressures in the valve body, as will be hereinafter described. A retaining ring 30 is provided having an angular internal side 31 which is fitted into the chamber 15 and engages against the shoulder 16 and has an annular lip portion 32 thereon which extends under and partially encompasses one side of the sealing ring 29 to hold this ring in position under slight compression between the edge of the retaining ring 30 and the end surface of the end portion 26 of the cap 22. Because the sealing ring 29 is partially encompassed by the retainer ring 30 at one of its sides and the seal wall 28 on its opposite side, only a small surface of the sealing ring 29 is exposed between the edge of the valve seat 27 and the retainer ring 30 and the sealing ring 29 is not easily displaced. When the valve is open, both the pressure of the fluid passing through the valve and also flow pressure is directly against the exposed surface of the sealing ring 29, thus tending to force it more securely into seated position in the chamber 15.

Slidably mounted in the chamber 17 is a poppet type valve 33 which has a chamber 34 therein open at the rear end of the valve 33, with an expansion spring 35 mounted therein, with one end of the spring 35 being seated against the shoulder 20 in the body member 10 and the forward end of the spring being seated against an annular internal shoulder 36 formed in the valve 33.

The valve 33 is reduced in diameter on its end towards the cap 22 adjacent the chamber 15 and has a head portion 37 at one end thereof, having a seat 38 formed thereon of the same angularity as is the seat 27 formed in the cap 22 and interfitting therewith to form a closure against the flow of a fluid through the cap 22 and normally in closed position held against the seat 27 by the spring 35. The head portion 37 has a plurality of passages such as 39 therein providing communication for the flow of fluid from the chamber 15 to the chamber 34, with the head portion 37 being slightly greater in diameter at the base of the seat 38 than is the diameter of the seat opening at its widest point which is adjacent the seal 29, so that when the valve 33 is seated the seal 29 is slightly compressed, as shown particularly in Fig. 4 of the drawings, and engages the head portion 37 of the valve 33 circumferentially around the rear portion of the seat 38 and a portion of the head 37 adjacent the seat 38. In this condition of the valve, back pressure from the flow-checked side of the valve 33 will be exerted against the side of the sealing ring 29 adjacent the retaining ring 30. This back pressure develops because the fluid under pressure passes around the retainer ring 30 between the wall of the body 10 and the lip of the retainer ring 30 adjacent the valve seat, thereby forcing the sealing ring 29 into tight sealing engagement with the wall of the valve body 10, the end of the cap 22 and the point of circumferential contact of the sealing ring 30 with the head portion 37 of the valve 33. The seal thus formed prevents leakage between the engaged surfaces of the cap 22 and body 10 and also through the valve seat 27, with the back pressure also holding the valve 33 in tight engagement with the seat 27. An effective auxiliary seal is thus formed for the valve and also prevents any leakage around any portion of the outer surface of the sealing member 29, so there is no leakage externally of the check valve and no packing is needed between the valve body 10 and the cap 22. The arrangement of the various parts of the valve is such, therefore, that a completely tight valve is provided even against very high pressures of liquids as is now common in industry.

Figure 5:
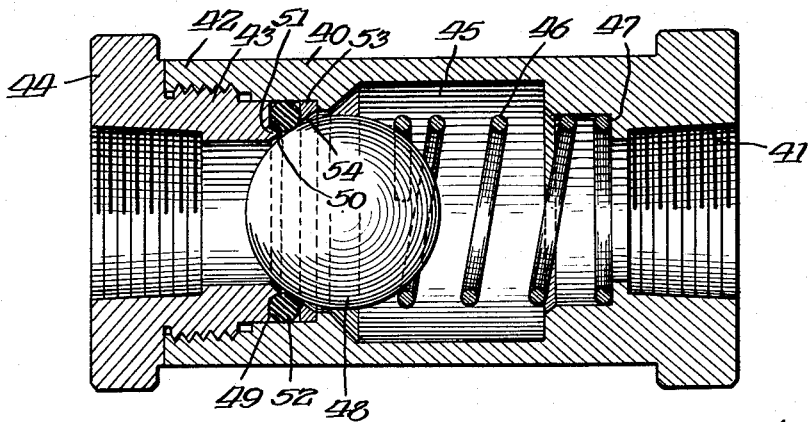
Fig. 5 is a sectional view similar to Fig. 1 showing a ball valve member instead of the poppet member as shown in the other figures of the drawings.

In Fig. 5 a modified form of valve is shown and in which a body member 40 is illustrated having a bore completely therethrough, with an internally threaded end 41 of the body 40 for attachment to a pipe, or the like, and also an internally threaded end portion 42 at its opposite end for engagement with an externally threaded portion 43 of a cap 44. An enlarged chamber 45 is provided in the body member 40 which has a spring 46 mounted therein which is seated against an annular shoulder 47 in the body member 40, with a ball 48 being provided which acts as a valve and performs the same function as the valve member 33 in the form illustrated in other figures of the drawing. The inner end of the cap member 44 has an annular surface 49 which extends at right angles to the bore through the cap 44 and also has an annular angularly disposed valve seat 50 thereon which is formed on one side of a triangular-shaped projecting portion 51 of the cap member 44 and which merges into the surface 49 to form a retainer for an O sealing member 52 which is mounted in the space between the surface 49 on the end of the cap member 44 and a retainer ring 53 which has an inclined inner face 54 thereon at approximately the same angle as is the valve seat 50 but spaced in such manner that the sealing member 52 extends slightly beyond the alignment of the valve face 50 and of the face 54, so that when the ball 48 is in engagement with the valve seat 50, the O shaped sealing member 52 is deformed slightly and the elastic sealing ring performs in the same manner as it does in the valve illustrated in Fig. 1, as hereinabove described. In this manner, in both forms of the check valve shown, a complete seal is formed so that packing is not needed between the body member and the cap member, resulting in both labor-saving in grinding to accuracy and in making possible a check valve for use in high pressure lines where tolerances in metal, grinding, etc. can be compensated for through the use of the sealing ring placed under compression, with the result that a check valve can be manufactured at much less cost and with more assurance of satisfactory operation than has been possible heretofore.

In order that the seating of the poppet 33 and the ball 48 be proper, the spacing of the wrench portion 24 in the cap 22 where it meets with the end of the body member 10 must be maintained, otherwise the poppet 33 and the ball 48 would not seat accurately, but because no sealing or packing is needed at this point, this is easily accomplished and when these elements are fitted together, this distance is always a proper one and not subject to variation due to different kinds and grades of packing which might be used at these points and which is now used in check valves of this type and character.

An operation of the valves, of course, will be understood from the foregoing description in that wherever a check valve is needed in the operation of a mechanism, particularly under hydraulic pressure, the cap is attached to a line leading to any source of supply of hydraulic pressure, so that when fluid is admitted through the cap of the valve, in each instance it strikes against the face of the poppet 33 or the ball 48, as the case may be, forcing these members away from their seats against the pressure of the springs 35 or 46, as the case may be, and fluid is admitted in the case of the poppet valve around the head of the valve and through the openings 39 into the chamber 34 and out through the pipe connected to the body of the valve in each instance. If, of course, the pressure of the fluid admitted to the cap 22 is not sufficient to overcome the force of the spring, fluid will not be admitted, and if it is desired to place the check valve in position where balanced pressure is necessary to be maintained, the spring will function whenever the pressure of the fluid in the cap is sufficient to overcome the resistance of the spring and the back pressure in the cap itself. The ball 48 in the modified form would function in precisely the same manner. In this manner the check valve functions automatically and as may be desired.

While I have described more or less precisely the details of construction, I do not wish to be understood as limiting myself thereto, as I contemplate changes in form, the proportion of parts and the substitution of equivalents as circumstances may suggest or render expedient without departing from the spirit or scope of the invention.

What is claimed is:

1. A high pressure valve assembly comprising in combination a valve body having a bore therethrough and having at least one threaded end, a reciprocating valve in said body having an inclined face at one of its ends, an O-shaped elastic seal in said body cooperating with the outermost periphery of said inclined face, an expansion spring in the valve body in engagement with the said valve, a valve plug in threaded engagement with the said valve body, and having a valve seat thereon to co-operate with the said inclined valve face and also having an arcuate seal seat formed thereon extending circumferentially around the valve seat and overlying a portion of the inner face of said elastic seal, a seal retaining ring anchored in the valve body having an arcuate seal engaging surface thereon and overlying a portion of the face of said elastic seal and spaced from the end of the plug whereby a seal receiving chamber is formed by the valve body, the retaining ring and the plug, with a circumferentially open channel being formed at one side of the said seal receiving chamber adjacent the valve seat, said elastic seal in said chamber substantially conforming in cross sectional area to the cross section of the seal receiving chamber in engagement with the valve body, the plug, and the inclined face of the valve, when in closed position, to form both a body seal and a valve seal and responsive to fluid pressure applied to the crown of the said seal through the said circumferential channel by the fluid in the valve body when the valve is open to form a body seal, and anchored by the retaining ring and the plug against displacement by fluid pressure when the valve is open.

2. A high pressure check valve assembly comprising in combination a valve body having a bore therethrough and having at least one threaded end, a movable valve in the said body, an expansion spring mounted in the bore of the said body in engagement with the said valve, a valve plug in threaded engagement with the valve body having a valve seat thereon and a seal seat adjacent the valve seat and extending circumferentially thereof, a seal retaining ring mounted in the valve body and spaced from the end of the said plug, and a substantially O-shaped elastic seal between the seal retaining ring and the seat on the said plug and in engagement with the body of the valve and extending into the space between the adjacent peripheral edges of the said retaining ring and the valve seat and responsive to pressure from the valve when the valve is in closed position and to pressure from the fluid passing through the valve body when in open position, said seal seat adjacent the valve seat and said seal retaining ring opposite thereto having a spherical curvature thereat for supporting opposed peripheral portions of said O-shaped seal, the said pressure from the valve and from the fluid being applied to the crown of the O-ring seal.

3. A high pressure valve assembly comprising in combination a valve body having a bore therethrough and having at least one threaded end, a reciprocating valve in said body having an inclined face at one of its ends, an expansion spring in the valve body in engagement with the said valve, a valve plug in threaded engagement with the said valve body and having a valve seat thereon to cooperate with the said valve face and also having a seal seat formed thereon extending circumferentially around the valve seat, a seal retaining ring anchored in the valve body having a seal engaging surface thereon and spaced from the end of the plug whereby a seal receiving chamber is formed by the valve body, the retaining ring and the plug, the said chamber being circumferentially open adjacent the valve seat, and an elastic seal in said chamber in engagement with the valve body, the plug, the retaining ring and the face of the valve when in closed position to form both a body seal and a valve seal when the valve is in closed position and responsive to fluid pressure in the valve body to form a body seal when the valve is open, the said elastic seal being anchored against and supported along the major portion of each of its front and rear sides and having a small portion of its inner periphery extending into the space between the edge of the retaining ring and the edge of the valve seat whereby pressure of a fluid passing through the valve assembly when open and the valve when closed expands the seal into tight interfitting engagement with the plug, the valve body, and seal retaining ring and is anchored against displacement by high fluid pressure when the valve is open.

4. A high pressure valve assembly comprising in combination a valve body having a bore therethrough and having at least one threaded end, a reciprocating valve in said body having an inclined face at one of its ends, an expansion spring in the valve body in engagement with the said valve, a valve plug in threaded engagement with the said valve body and having a valve seat thereon to co-operate with the said valve face and also having a seal seat formed thereon extending circumferentially around the valve seat, a seal retaining ring anchored in the bore of the valve body having a seal engaging surface thereon and spaced from the end of the plug whereby a seal receiving chamber is formed by the valve body, the retaining ring and the plug, the said chamber being circumferentially open to the bore in the valve body adjacent the valve seat, and an elastic seal in said chamber in engagement with the valve body, the valve when closed, the valve seat and the said plug, the said seal substantially filling the seal receiving chamber and forming both a body seal and a valve seal when in closed position and responsive to the fluid pressure in the valve body to form a body seal when the valve is open, the said elastic seal being anchored against and supported along the major portion of each of its front and rear sides and having a small portion of its outer periphery extending into the space between the edge of the retaining ring and the edge of the valve seat whereby pressure of a fluid passing through the valve assembly when open and the valve when closed expands the seal into tight interfitting engagement with the plug, the body of the valve, and seal retaining ring and is anchored against displacement by high fluid pressure when the valve is open.

References Cited in the file of this patent

UNITED STATES PATENTS

| | | |
|---|---|---|
| 2,417,494 | Hoof | Mar. 18, 1947 |
| 2,519,541 | Bryant | Aug. 22, 1950 |
| 2,670,922 | Carlisle | Mar. 2, 1954 |
| 2,673,062 | Cornelius | Mar. 23, 1954 |
| 2,676,782 | Bostock | Apr. 27, 1954 |
| 2,693,201 | Page | Nov. 2, 1954 |
| 2,706,487 | Wilson | Apr. 19, 1955 |
| 2,847,182 | Mancusi | Aug. 12, 1958 |

FOREIGN PATENTS

| | | |
|---|---|---|
| 262,061 | Switzerlnd | Sept. 16, 1949 |
| 76,427 | Norway | Mar. 13, 1950 |